United States Patent
Warren et al.

(10) Patent No.: US 9,366,586 B2
(45) Date of Patent: Jun. 14, 2016

(54) HIGH TEMPERATURE UNCOOLED OPTICAL PROBE

(71) Applicant: UNITED TECHNOLOGIES CORPORATION, Hartford, CT (US)

(72) Inventors: Eli Cole Warren, Wethersfield, CT (US); Benjamin D. Cyr, Vernon, CT (US)

(73) Assignee: United Technologies Corporation, Hartford, CT (US)

( * ) Notice: Subject to any disclaimer, the term of this patent is extended or adjusted under 35 U.S.C. 154(b) by 79 days.

(21) Appl. No.: 14/208,811

(22) Filed: Mar. 13, 2014

(65) Prior Publication Data

US 2014/0270625 A1    Sep. 18, 2014

Related U.S. Application Data

(60) Provisional application No. 61/781,444, filed on Mar. 14, 2013.

(51) Int. Cl.
*G02B 6/00* (2006.01)
*G01L 1/24* (2006.01)

(52) U.S. Cl.
CPC .................................. *G01L 1/242* (2013.01)

(58) Field of Classification Search
None
See application file for complete search history.

(56) References Cited

U.S. PATENT DOCUMENTS

| | | | | |
|---|---|---|---|---|
| 5,201,227 | A * | 4/1993 | Iinuma et al. ............... | 73/655 |
| 5,366,290 | A * | 11/1994 | Mayer et al. ............... | 374/130 |
| 5,594,819 | A * | 1/1997 | Narendran et al. ......... | 385/12 |
| 7,340,129 | B2 * | 3/2008 | Yalin et al. ................. | 385/31 |
| 8,035,822 | B2 * | 10/2011 | Riza et al. .................. | 356/519 |
| 8,280,202 | B2 * | 10/2012 | Xia et al. .................... | 385/13 |
| 2004/0057645 | A1* | 3/2004 | Willner ....................... | 385/12 |
| 2004/0161221 | A1* | 8/2004 | Kashihara et al. .......... | 385/139 |
| 2008/0297808 | A1* | 12/2008 | Riza et al. ................... | 356/503 |
| 2009/0110351 | A1* | 4/2009 | Buckley ............... | G02B 6/26 384/33 |
| 2010/0080500 | A1* | 4/2010 | Zheng ................. | G01B 11/14 385/12 |

* cited by examiner

*Primary Examiner* — Sung Pak
(74) *Attorney, Agent, or Firm* — Kinney & Lange, P.A.

(57) ABSTRACT

An optical probe includes a first end, a second end, an outer housing, an inner housing concentric with the outer housing, flow holes within the inner housing at the first end, and an optics holder within the inner housing between the flow holes and the second end. The optical probe further includes high temperature optical lenses inside the optics holder between the flow holes and the second end, fiber holders inside the optics holder between the high temperature optical lenses and the second end, optical fibers coated in a high temperature material extending from inside fiber holders towards the second end, and a high temperature adhesive for securing the optical fibers, the fiber holders, and the high temperature optical lenses.

14 Claims, 5 Drawing Sheets

US 9,366,586 B2

HIGH TEMPERATURE UNCOOLED OPTICAL PROBE

CROSS-REFERENCE TO RELATED APPLICATION(S)

This application claims priority from U.S. Provisional Application No. 61/781,444, filed Mar. 14, 2013 for "HIGH TEMPERATURE UNCOOLED OPTICAL PROBE" by Eli Cole Warren et al.

BACKGROUND

The present invention relates to optical probes for non-intrusive stress measurement systems (NSMS), and more specifically relates to a high temperature optical probe for a NSMS.

In the gas turbine engine, temperatures in the low pressure compressor can reach 400 degrees Fahrenheit. Temperatures in the high pressure compressor can reach 1200 degrees Fahrenheit. Current probes can only withstand temperatures of 350 to 400 degrees Fahrenheit due to temperature limitations of the optical fibers, lenses, and adhesive used to hold the probes together. As a result, current probes require cooling passages for coolant flows in order to cool the probes to 350 degrees Fahrenheit to prevent the probes from burning up in the high and low pressure compressors. Cooling flows are costly, as cooling the probes requires a significant amount of gaseous nitrogen (GN2). Coolant flowing from the probes may also cause problems with bleed flows in engine cavities, such as causing bleed flows to reverse direction. Additionally, inclusion of cooling passages increases the size of the probes, limiting where the probes can be placed within the engine.

SUMMARY

An optical probe includes a first end, a second end, an outer housing, an inner housing concentric with the outer housing, flow holes within the inner housing at the first end, and an optics holder within the inner housing between the flow holes and the second end. The optical probe further includes high temperature optical lenses inside the optics holder between the flow holes and the second end, fiber holders inside the optics holder between the high temperature optical lenses and the second end, optical fibers coated in a high temperature material extending from inside fiber holders towards the second end, and a high temperature adhesive for securing the optical fibers, the fiber holders, and the high temperature optical lenses.

An optical probe includes a first end, a second end, a housing, a protector disk within the housing at the first end, and an optics holder within the housing between the protector disk and the second end. The optical probe further includes high temperature optical lenses inside the optics holder between the protector disk and the second end, fiber holders inside the optics holder between the high temperature optical lenses and the second end, optical fibers coated in a high temperature material extending from inside fiber holders towards the second end, and a high temperature adhesive for securing the optical fibers, the fiber holders, and the high temperature optical lenses.

DETAILED DESCRIPTION

The high temperature uncooled optical probe of the present invention is constructed of materials that eliminate the need to flow gaseous nitrogen (GN2) through the probe for cooling when the high temperature uncooled probe is placed in the low pressure compressor or the high pressure compressor of a gas turbine engine. Additionally, the high temperature uncooled probe may be employed in the low pressure turbine and the high pressure turbine with a fraction of the cooling required for current optical probes. The internals of the high temperature optical probe of the present invention, including the optics holder, fiber holders, optical fibers, lenses, and adhesive, are all made of high temperature materials. In one embodiment, the high temperature optical probe also includes flow holes for GN2 purge flow to keep debris off of the lenses. In another embodiment, a protector disk is used to keep debris off of the lenses, requiring no GN2. Thus, the high temperature optical probe of the present invention significantly reduces GN2-related costs and the reduction of cooling requirements in turn reduces the size of the high temperature optical probe.

Figure 1:
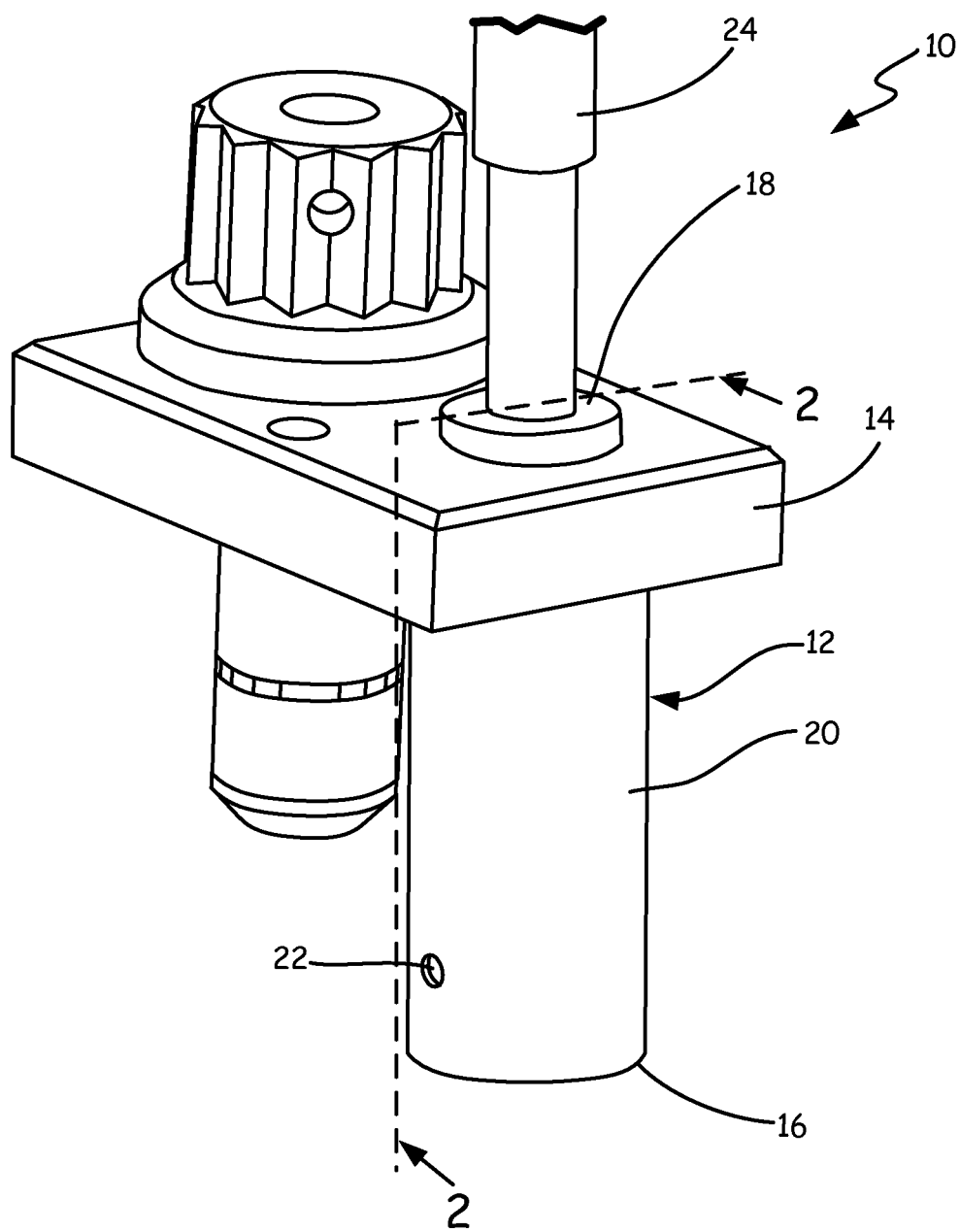
FIG. 1 is an isometric view of the high temperature uncooled optical probe of the present invention.

FIG. 1 is an isometric view of optical probe apparatus 10 including high temperature uncooled optical probe 12 mounted to mounting apparatus 14. High temperature uncooled optical probe 12 includes first end 16, second end 18, outer housing 20, inner housing 22, and hypotube 24. The reduced size of high temperature uncooled optical probe 12 due to elimination of cooling requirements and very little GN2 requirements allows optical probe apparatus 10 to fit between more externals and bolt configuration on flanges within a gas turbine engine. The optical fibers of high temperature uncooled optical probe extend into hypotube 24, which egresses out of the engine in a desired location.

Figure 2:
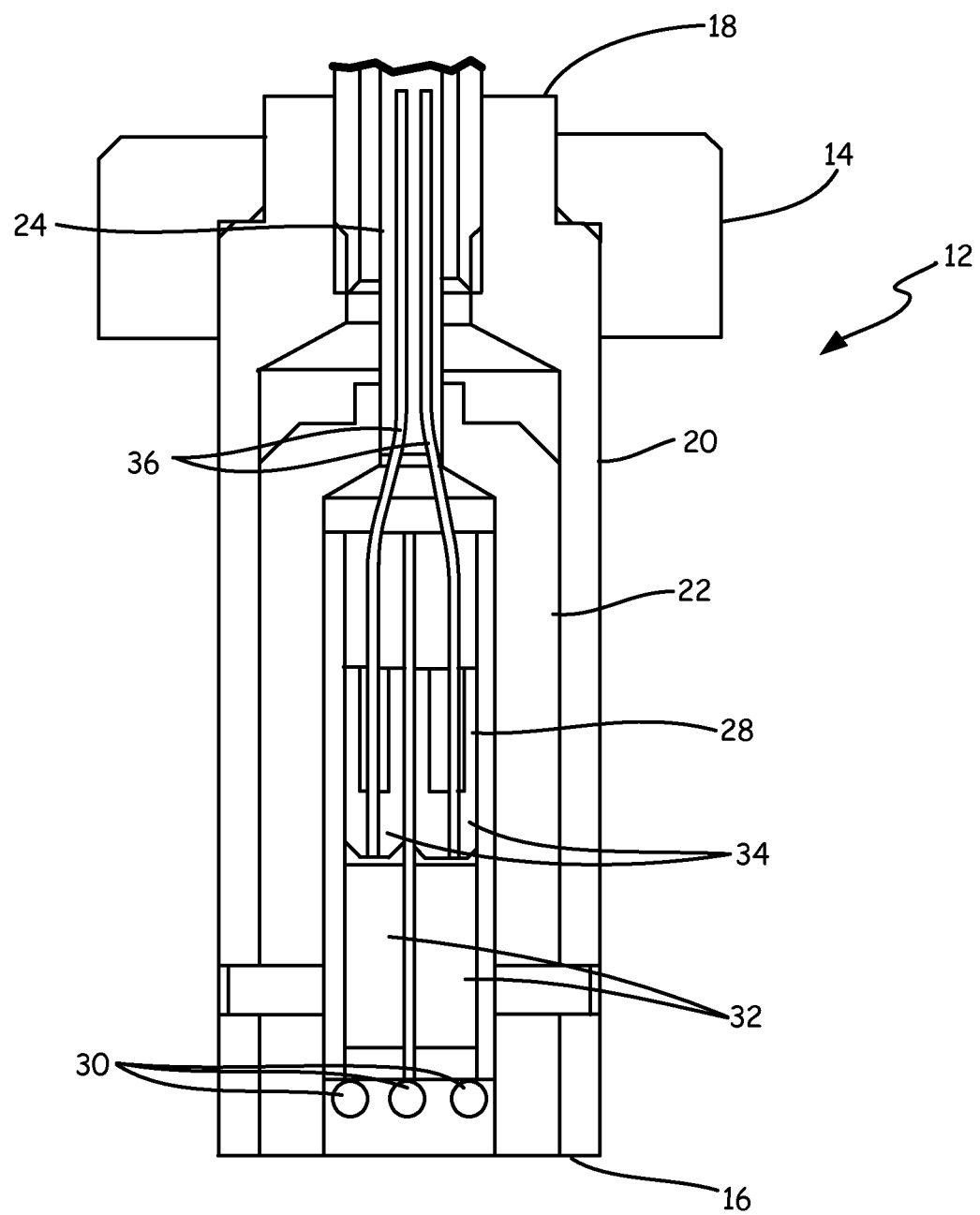
FIG. 2 is a cross section of the high temperature uncooled optical probe of the present invention along line 2-2 in FIG. 1.

FIG. 2 is a cross section of high temperature uncooled optical probe 12 mounted to mounting apparatus 14 along line 2-2 in FIG. 1. High temperature uncooled optical probe 12 includes first end 16, second end 18, outer housing 20, inner housing 22, hypotube 24, optics holder 28, flow holes 30, high temperature optical lenses 32, fiber holders 34, and optical fibers 36. Inner housing 22 is concentric with outer housing 20 and includes flow holes 30. Optics holder 28 contains the optics assembly of uncooled optical probe 12, including high temperature optical lenses 32 and fiber holders 34 holding optical fibers 36. An adhesive is used to hold high temperature optical lenses 32, fiber holders 34, and optical fibers 36 in place.

High temperature uncooled optical probe 12 is constructed with high temperature materials in order to reduce or eliminate cooling requirements and GN2 requirements. Optical fibers 36 may be coated in a high temperature material such as gold. This allows optical fibers 36 to withstand temperatures up to 1300 degrees Fahrenheit, making high temperature uncooled optical probe employable in every stage of high pressure compressors and low pressure compressors of a gas turbine engine. In an alternative embodiment, optical fibers 36 may be coated in copper. This allows optical fibers 36 to withstand temperatures up to 1120 degrees Fahrenheit, making high temperature uncooled optical probe 12 employable in almost every stage of high pressure compressors and low pressure compressors of a gas turbine engine.

High temperature optical lenses 32 may be convexed. Current probes employ gradient index of refraction (GRIN) lenses, which can withstand temperatures of up to 650 degrees Fahrenheit. Convexed lenses are a high temperature alternative to GRIN lenses. High temperature optical lenses 32 may be made of a transparent material, such as sapphire or silica. As a result, high temperature optical lenses 32 may withstand temperatures of up to 2000 degrees Fahrenheit. In one embodiment, high temperature optical lenses 32 may function as collimators.

Optics holder 28 and fiber holders 34 may be made of an alloy with a low coefficient of thermal expansion, because high temperature uncooled optical probe 12 is not cooled, therefore different parts will expand at different rates when exposed to varying temperatures in the gas turbine engine. In one embodiment, optics holder 28 and fiber holders 34 may be made of a superalloy, such as Incoloy®. In alternative embodiments, optics holder 28 and fiber holders 34 may be made of an alloy or a superalloy, such as Haynes® 242® or Waspaloy®. The adhesive used to hold high temperature optical lenses 32, fiber holders 34, and optical fibers 36 in place may be a high temperature adhesive, such as a Cotronics Resbond 907TS variant, which can withstand temperatures of up to 2200 degrees Fahrenheit.

When no cooling is required, as in most or all stages of the compressors of the gas turbine engine, high temperature uncooled optical probe 12 employs GN2 solely to prevent debris from accumulating on high temperature optical lenses. GN2 flows through flow holes 30 in order to purge high temperature optical lenses 32 of any debris that may accumulate during operation of the gas turbine engine. When no cooling is required, this GN2 is either used to only clean the lenses, at a fraction of the mass flow rate, or not used at all. This prevents high quantities of another foreign gas from being introduced into the gas path of the gas turbine engine, avoiding problems with bleed flows in engine cavities, such as causing bleed flows to reverse direction.

In alternative embodiments, high temperature uncooled optical probe 12 may be employed in the low pressure turbine and high temperature turbine of the gas turbine engine, where some cooling may be required. If temperatures in turbine stages in which high temperature uncooled optical probe 12 is installed reach higher than 1120 degrees Fahrenheit or higher than 1300 degrees Fahrenheit, cooling may be provided by flowing GN2 through inner housing 22 and expelling the GN2. Even when cooling is required at higher temperatures in some turbine stages, the amount of GN2 required for cooling is much less than the amount of GN2 required to cool current optical probes not constructed with high temperature materials.

Figure 3:
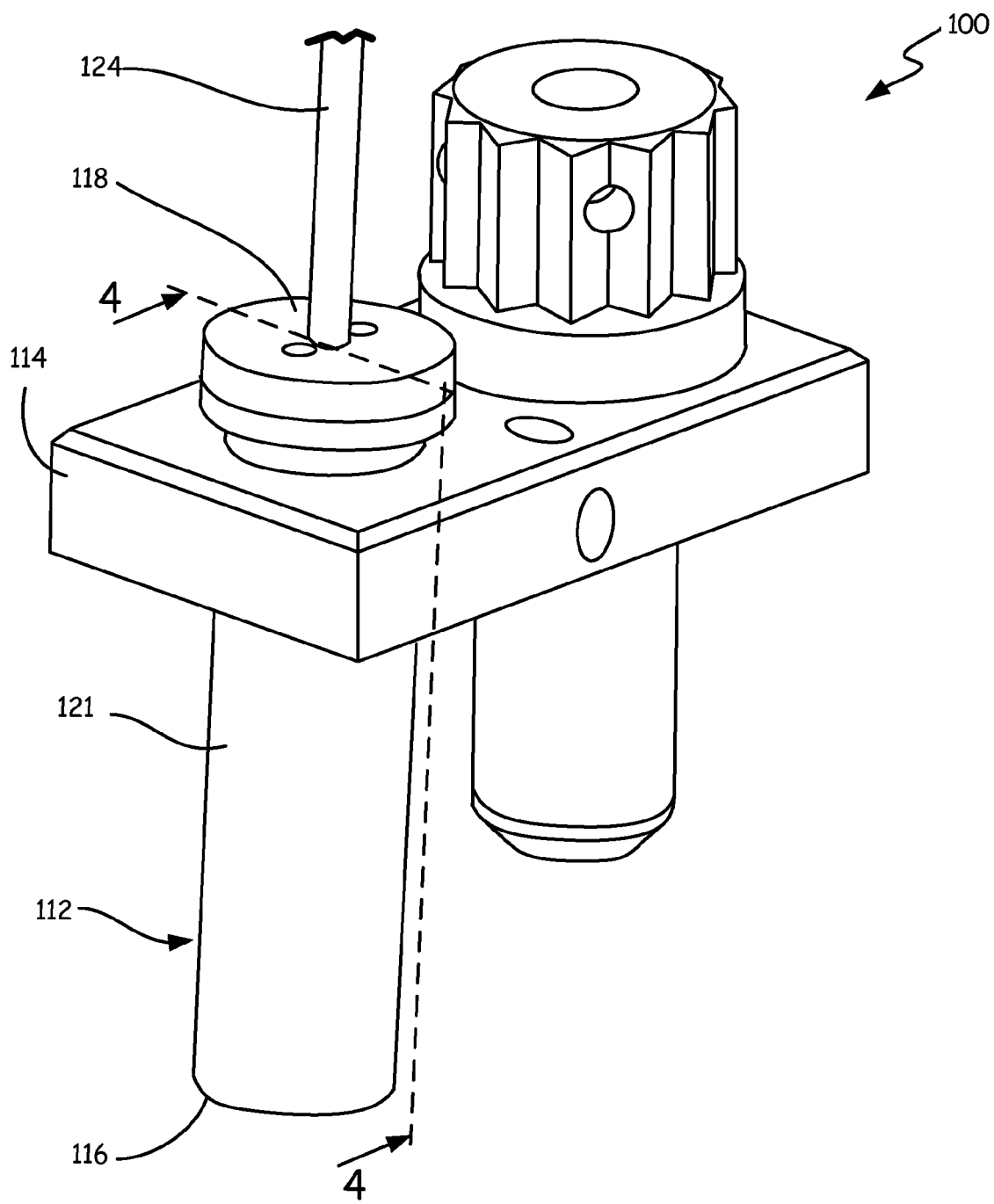
FIG. 3 is an isometric view of an alternate embodiment of the high temperature uncooled optical probe of the present invention.

FIG. 3 is an isometric view of optical apparatus 100 including an alternate embodiment of the present invention, high temperature uncooled optical probe 112, mounted to mounting apparatus 114. High temperature uncooled optical probe 112 includes first end 116, second end 118, housing 121, and hypotube 124. Due to elimination of cooling requirements and GN2 requirements, the reduced size of high temperature uncooled optical probe 112 allows optical probe apparatus 100 to fit into tighter spaces within a gas turbine engine. The optical fibers of high temperature uncooled optical probe extend into hypotube 124, which egresses out of the engine in a desired location.

Figure 4:
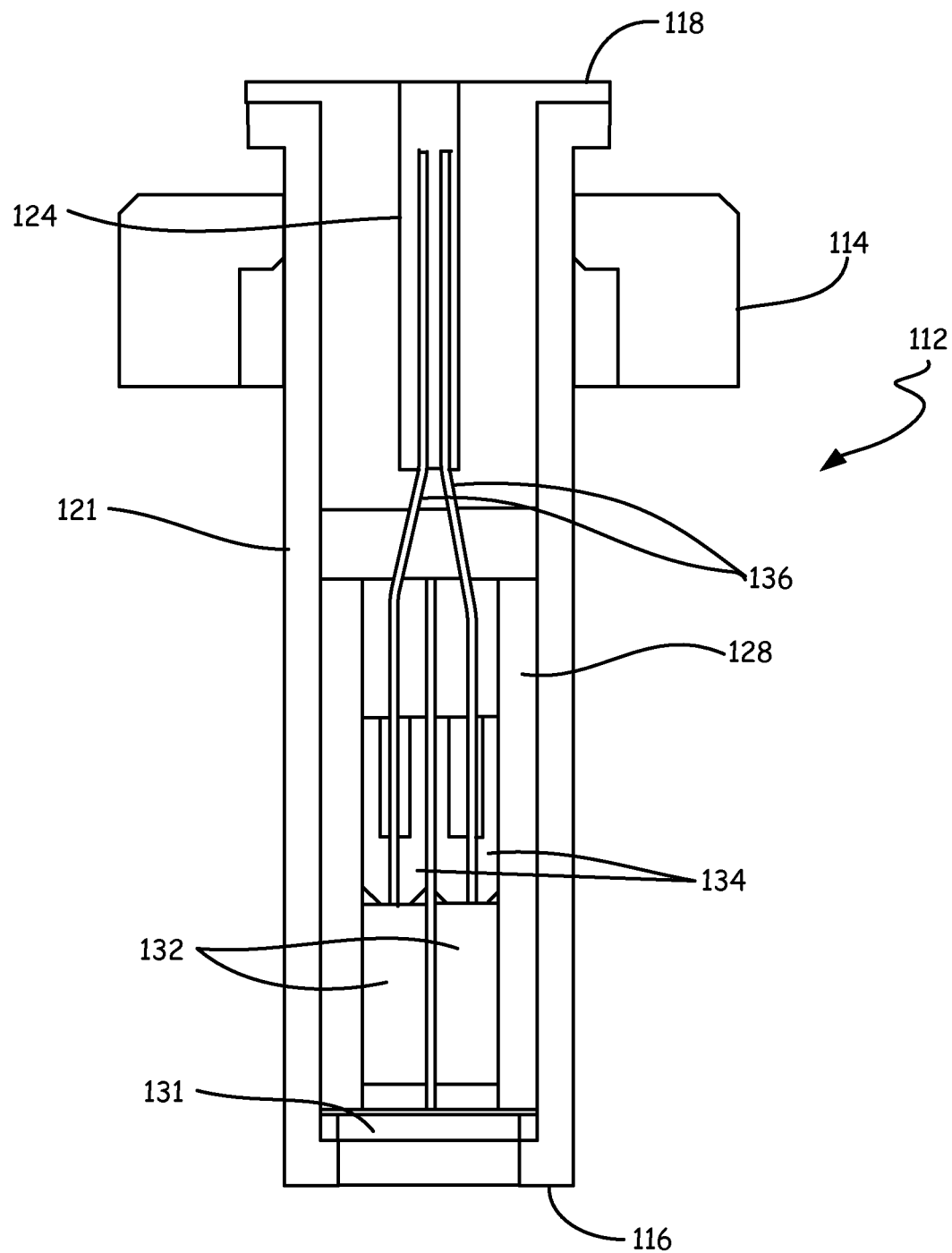
FIG. 4 is a cross section of the alternate embodiment high temperature uncooled optical probe of the present invention along line 4-4 in FIG. 3.

FIG. 4 is a cross section of high temperature uncooled optical probe 112 mounted to mounting apparatus 114 along line 4-4 in FIG. 3. High temperature uncooled optical probe 112 includes first end 116, second end 118, housing 121, hypotube 124, optics holder 128, protector disk 131, high temperature optical lenses 132, fiber holders 134, and optical fibers 136. Housing 121 contains optics holder 128 and protector disk 131. Optics holder 28 contains the optics assembly of uncooled optical probe 112, including high temperature optical lenses 132 and fiber holders 134 holding optical fibers 136. An adhesive is used to hold high temperature optical lenses 132, fiber holders 134, and optical fibers 136 in place.

High temperature uncooled optical probe 112 is constructed with high temperature materials in order to reduce or eliminate cooling requirements and GN2 requirements. Optical fibers 136 may be coated in a high temperature material such as gold. This allows optical fibers 136 to withstand temperatures up to 1300 degrees Fahrenheit, making high temperature uncooled optical probe employable in every stage of high pressure compressors and low pressure compressors of a gas turbine engine. In an alternative embodiment, optical fibers 36 may be coated in copper. This allows optical fibers 136 to withstand temperatures up to 1120 degrees Fahrenheit, making high temperature uncooled optical probe 112 employable in almost every stage of high pressure compressors and low pressure compressors of a gas turbine engine.

High temperature optical lenses 132 may be convexed. Current probes employ gradient index of refraction (GRIN) lenses, which can withstand temperatures of up to 650 degrees Fahrenheit. Convexed lenses are a high temperature alternative to GRIN lenses. High temperature optical lenses 132 may be made of a transparent material, such as sapphire or silica. As a result, high temperature optical lenses 132 may withstand temperatures of up to 2000 degrees Fahrenheit. In one embodiment, high temperature optical lenses 132 may function as collimators.

Optics holder 128 and fiber holders 134 may be made of an alloy with a low coefficient of thermal expansion, because high temperature uncooled probe 112 is not cooled, therefore different parts will expand at different rates when exposed to varying temperatures in the gas turbine engine. In one embodiment, optics holder 128 and fiber holders 134 may be made of a superalloy, such as Incoloy®. In alternative embodiments, optics holder 128 and fiber holders 134 may be made of an alloy or a superalloy, such as Haynes® 242® or Waspaloy®. The adhesive used to hold high temperature optical lenses 132, fiber holders 134, and optical fibers 136 in place may be a high temperature adhesive, such as a Cotronics Resbond 907TS variant, which can withstand temperatures of up to 2200 degrees Fahrenheit.

Protector disk 131 may be transparent in order to avoid optically disrupting high temperature optical lenses 132. Protector disk 131 completely eliminates the need for GN2 in high temperature uncooled optical probe 112. Protector disk 131 is placed in front of high temperature optical lenses 132 in order to prevent accumulation of any debris on high temperature optical lenses 132 during operation of the gas turbine engine.

Figure 5:
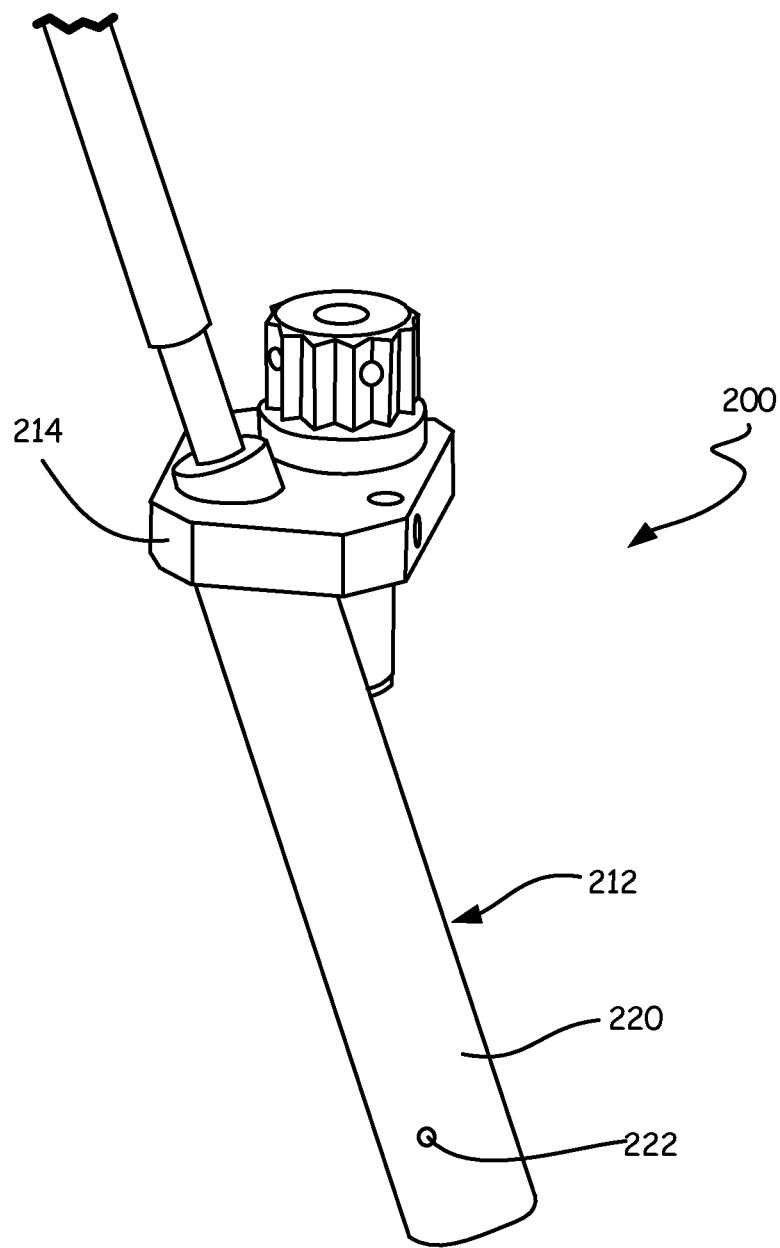
FIG. 5 is an isometric view an alternate embodiment of the high temperature uncooled optical probe of the present invention.

FIG. 5 is an isometric view of optical apparatus 200 including an alternate embodiment of the present invention, high temperature uncooled optical probe 212 with outer housing 220 and inner housing 222, mounted to mounting apparatus 214. Depending on in which stage of a compressor or turbine in a gas turbine engine high temperature uncooled optical probe 212 is employed, outer housing 220 of high temperature uncooled optical probe 212 may need to be shortened or lengthened. Additionally, outer housing 220 may need to be angled in order to mount high temperature optical probe 212 to mounting apparatus 214 at an angle. The design of high temperature uncooled optical probe 212 allows for shortening or lengthening, as well as mounting at an angle, without requiring a change in the configuration of inner housing 222, which holds the internal optics assembly of high temperature uncooled optical probe 212.

Discussion of Possible Embodiments

The following are non-exclusive descriptions of possible embodiments of the present invention.

An optical probe according to an exemplary embodiment of this disclosure, among other possible things includes: a first end, a second end, an outer housing, an inner housing concentric with the outer housing, flow holes within the inner housing at the first end, and an optics holder within the inner housing between the flow holes and the second end. The optical probe further includes high temperature optical lenses inside the optics holder between the flow holes and the second end, fiber holders inside the optics holder between the high temperature optical lenses and the second end, optical fibers coated in a high temperature material extending from inside fiber holders towards the second end, and a high temperature adhesive for securing the optical fibers, the fiber holders, and the high temperature optical lenses.

A further embodiment of the foregoing optical probe, wherein the plurality of optical fibers are coated in gold or copper.

A further embodiment of any of the foregoing optical probes, wherein the plurality of high temperature optical lenses are convexed.

A further embodiment of any of the foregoing optical probes, wherein the plurality of high temperature optical lenses comprise silica or sapphire.

A further embodiment of any of the foregoing optical probes, wherein the optics holder and the plurality of fiber holders comprise an alloy with a low coefficient of thermal expansion.

A further embodiment of any of the foregoing optical probes, wherein the optics holder comprises a superalloy or an alloy, such as Incoloy®, Haynes® 242®, or Waspaloy®.

A further embodiment of any of the foregoing optical probes, wherein the plurality of fiber holders comprise a superalloy or an alloy, such as Incoloy®, Haynes® 242®, or Waspaloy®.

A further embodiment of any of the foregoing optical probes, wherein the optical probe can withstand temperatures of up to 1300 degrees Fahrenheit.

A further embodiment of any of the foregoing optical probes, wherein the plurality of flow holes channel a gaseous nitrogen purge flow for preventing debris from accumulating on the plurality of high temperature optical lenses.

A high temperature uncooled optical probe according to another exemplary embodiment of this disclosure, among other possible things includes: a first end, a second end, a housing, a protector disk within the housing at the first end, and an optics holder within the housing between the protector disk and the second end. The optical probe further includes high temperature optical lenses inside the optics holder between the protector disk and the second end, fiber holders inside the optics holder between the high temperature optical lenses and the second end, optical fibers coated in a high temperature material extending from inside fiber holders towards the second end, and a high temperature adhesive for securing the optical fibers, the fiber holders, and the high temperature optical lenses.

A further embodiment of the foregoing optical probe, wherein the plurality of optical fibers are coated in gold or copper.

A further embodiment of any of the foregoing optical probes, wherein the plurality of high temperature optical lenses are convexed.

A further embodiment of any of the foregoing optical probes, wherein the plurality of high temperature optical lenses comprise silica or sapphire.

A further embodiment of any of the foregoing optical probes, wherein the optics holder and the plurality of fiber holders comprise an alloy with a low coefficient of thermal expansion.

A further embodiment of any of the foregoing optical probes, wherein the optics holder comprises a superalloy or an alloy, such as Incoloy®, Haynes® 242®, or Waspaloy®.

A further embodiment of any of the foregoing optical probes, wherein the plurality of fiber holders comprise a superalloy or an alloy, such as Incoloy®, Haynes® 242®, or Waspaloy®.

A further embodiment of any of the foregoing optical probes, wherein the optical probe can withstand temperatures of up to 1300 degrees Fahrenheit.

A further embodiment of any of the foregoing optical probes, wherein the protector disk prevents debris from accumulating on the plurality of high temperature optical lenses.

Although the present invention has been described with reference to preferred embodiments, workers skilled in the art will recognize that changes may be made in form and detail without departing from the spirit and scope of the invention.

The invention claimed is:

1. An optical probe comprising:
   a first end;
   a second end;
   an outer housing;
   an inner housing concentric with the outer housing;
   a plurality of flow holes within the inner housing at the first end;
   an optics holder having a low coefficient of thermal expansion within the inner housing between the plurality of flow holes and the second end;
   a plurality of high temperature optical lenses inside the optics holder between the plurality of flow holes and the second end;
   a plurality of fiber holders having a low coefficient of thermal expansion inside the optics holder between the plurality of high temperature optical lenses and the second end;
   a plurality of optical fibers extending from inside the plurality of fiber holders towards the second end and coated in gold or copper to allow the optical fibers to withstand temperatures of up to at least 1120 degrees Fahrenheit; and
   a high temperature adhesive capable of withstanding up to 2200 degrees Fahrenheit for securing the plurality of optical fibers, the plurality of fiber holders, and the plurality of high temperature optical lenses, so that the optical probe can withstand temperatures of up to 1120 degrees Fahrenheit;
   wherein the plurality of flow holes are configured to expel gaseous nitrogen across an outer surface of the high temperature optical lenses.

2. The optical probe of claim 1, wherein the plurality of high temperature optical lenses are convex.

3. The optical probe of claim 2, wherein the plurality of high temperature optical lenses comprise silica or sapphire.

4. The optical probe of claim 1, wherein the optics holder comprises Incoloy®, Haynes® 242®, or Waspaloy®.

5. The optical probe of claim 1, wherein the plurality of fiber holders comprise Incoloy®, Haynes® 242®, or Waspaloy®.

6. An optical probe comprising:
a first end;
a second end;
a housing;
a protector disk within the housing at the first end;
an optics holder within the housing between the protector disk and the second end;
a plurality of high temperature optical lenses inside the optics holder between the protector disk and the second end;
a plurality of fiber holders inside the optics holder between the plurality of high temperature optical lenses and the second end;
a plurality of optical fibers coated in a high temperature material extending from inside the plurality of fiber holders towards the second end; and
a high temperature adhesive for securing the plurality of optical fibers, the plurality of fiber holders, and the plurality of high temperature optical lenses, so that the optical probe can withstand temperatures of up to 1120 degrees Fahrenheit without circulation of a cooling fluid within the housing.

7. The optical probe of claim 6, wherein the plurality of optical fibers are coated in gold or copper.

8. The optical probe of claim 6, wherein the plurality of high temperature optical lenses are convex.

9. The optical probe of claim 8, wherein the plurality of high temperature optical lenses comprise silica or sapphire.

10. The optical probe of claim 6, wherein the optics holder and the plurality of fiber holders comprise an alloy with a low coefficient of thermal expansion.

11. The optical probe of claim 10, wherein the optics holder comprises Incoloy®, Haynes® 242®, or Waspaloy®.

12. The optical probe of claim 10, wherein the plurality of fiber holders comprise Incoloy®, Haynes® 242®, or Waspaloy®.

13. The optical probe of claim 6, wherein the high temperature adhesive can withstand temperatures of up to 2200 degrees Fahrenheit.

14. The optical probe of claim 6, wherein the protector disk prevents debris from accumulating on the plurality of high temperature optical lenses.

* * * * *